Jan. 28, 1958   L. W. PARKER ET AL   2,821,581
MULTIPLE CONTACT ELECTRIC SWITCH
Filed Jan. 18, 1957
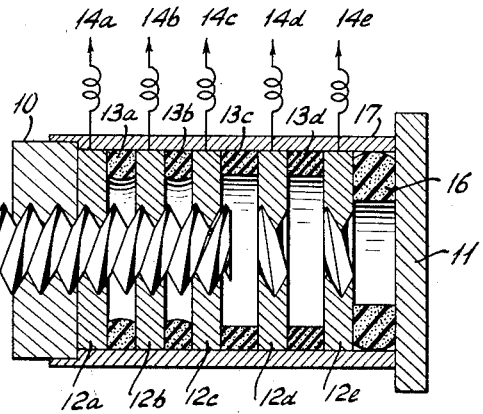
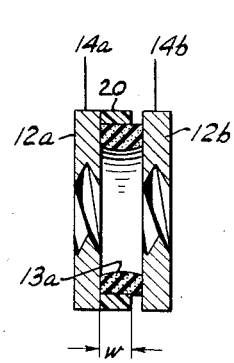
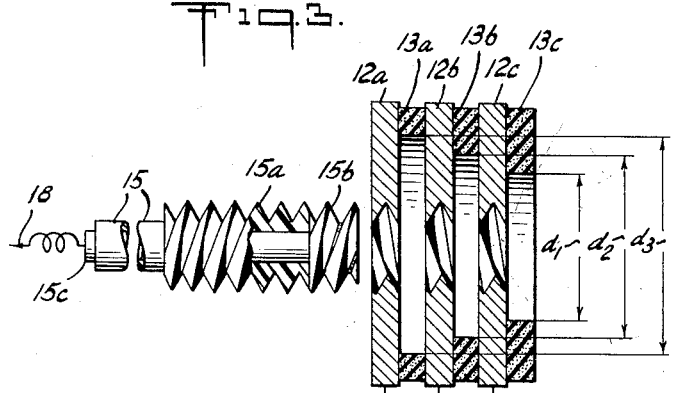
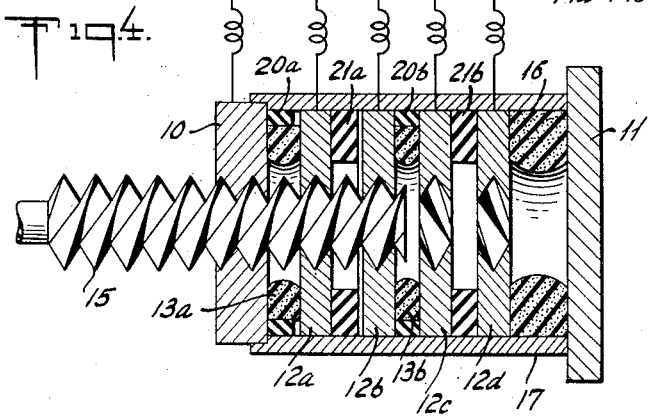
INVENTORS
LOUIS W. PARKER
PAUL SMITH
BY
ATTORNEY

2,821,581

MULTIPLE CONTACT ELECTRIC SWITCH

Louis W. Parker, Oyster Bay Cove, and Paul Smith, Cambria Heights, N. Y.; said Smith assignor to said Parker Application January 18, 1957, Serial No. 634,918

18 Claims. (Cl. 200—16)

The present invention relates to manually operated electric switches and is more particularly concerned with a multiple contact electric switch construction wherein a rotatable screw is utilized for selective switching purposes.

This invention is an improved form of the switch described in my U. S. Patent #2,755,364, which patent is hereby incorporated into this present description by reference.

The switch shown and described in said patent comprises essentially a stack of conducting members or stationary contacts, such as metal washers, alternating with insulating spacing members or washers of a compressible insulating material, such as silicone rubber or the like, said conducting members or washers having internal threads cooperating with a movable contact in the form of a rotatable screw member adapted to be advanced and withdrawn within said stack, in such a manner as to engage and disengage the threads of said conducting members or contacts, to effect selective electric contact connections therewith.

According to one embodiment of a switch of this type, the spacing washers between the conductive washers have a greater thickness when said conductive washers are non-engaged by the screw member, and are compressed to a smaller thickness when the adjacent conductive washers are engaged by said screw member. The reduced spacing between conductive washers and resulting compression of insulating washers creates a compressive elastic force which tends to maintain an intimate electrical contact between the interengaging conductive washers and said screw member. The change in spacing between the conductive washers due to engagement of said screw member may be in the order of 10%, to obtain a suitable contact pressure.

Due to the greater spacing between non-engaged conductive washers, the screw member must have the leading thread flared forward in order to initially engage the conductive washer. A complete description of this principle is given in the referenced patent.

According to an alternative embodiment, the insulating washers between non-engaged adjacent conducting washers are pre-compressed, by means of a suitable stack pressure or clamping device, to a thickness less than the spacing distance between adjacent conducting washers in their engaged position with said screw member, whereby to result in an expansion of the spacing washers upon engagement of the adjacent conducting washers by said screw member. Said screw member as used in this embodiment has a uniform thread throughout its length. Positive contact pressure is obtained by using insulating washers whose normal thickness (before assembly) is greater than the distance between engaged conductive washers. This mode of operation is also described in the above referenced U. S. patent.

In a switch of this type which is free from the effects of mechanical shock and vibration by virtue of the resilient support or mounting of the contacts, the elastic compressive or expansive force of the insulating spacing members upon the conducting members results in a reliable and effective contact connection between the movable and stationary switch contacts.

A general object of the present invention is to increase the reliability and usefulness of a switch of the above type. A more specific object of the present invention is the provision of limits for the compression and expansion of the resilient members.

Another object of the invention is to provide for a definite amount of differential pressures applied to the two sides of the metal conducting washer.

It is a further object of the invention to insure a uniform contact connection between the movable contact member and the relatively stationary switch contacts even after prolonged operation or use of the switch.

It is a still further object of this invention to provide a switch in which the contact pressure between stationary and movable contacts can be controlled or adjusted to specified values and further, to provide different contact pressures for each contact, if so desired.

The invention, as to its further objects and novel aspects, will be better understood from the following detailed description of a few practical embodiments taken in reference to the accompanying drawing, forming part of this specification and wherein:

Fig. 1 is a cross-sectional view of an improved switch construction embodying the principles of the invention;

Fig. 2 is an enlarged partial view of Fig. 1, including an improved feature of the invention;

Fig. 3 is another enlarged partial view showing a modification of the invention; and Fig. 4 is a sectional view similar to Fig. 1 and showing still another modification of a switch according to the invention.

Referring to the drawing, wherein like reference characters denote like parts in the different views, the improved multiple switch shown in Fig. 1 comprises essentially a stack of conducting members or stationary contacts $12a$–$12e$, such as metal washers, alternating with spacing members or washers $13a$–$13d$ consisting of a compressible insulating material, such as silicone rubber or the like, the stack being suitably pre-clamped or mounted between a pair of supports or mounting plates 10 and 11 by any means (not shown), to effect a desired preliminary compression of the insulating washers or spacing members $13a$–$13d$. The conducting washers $12a$–$12e$ forming the stationary switch contacts are connected through leads or conductors $14a$–$14e$ to points of the external circuitry to be controlled by the switch.

Cooperating with the metal washers or contacts $12a$–$12e$ is a movable contact in the form of a rotatable screw member 15 coaxial with the stack and adapted to engage internal threads in said metal washers, in such a manner as to progressively engage and effect electric contact connection with successive metal washers or stationary contacts $12a$–$12e$ of the stack. The insulating washers in their normal position, that is, with the adjacent conducting washers being disengaged from such screw member, such as in the case of the washer $13d$ of Fig. 1, having a thickness greater than the spacing distance between adjacent conducting washers in their engaged position with the screw member. As a result, insulating washers between engaged conducting washers are compressed and exert a pressure upon said conducting washers to cause an intimate contact between said conducting washers and cooperating screw member, as shown by the washers $13a$ and $13b$, in Fig. 1.

As an example, the leads $14a$–$14e$ may be connected to the tap points of a tapped impedance with the screw member 15 forming the adjustable contact by progressively short-circuiting incremental impedance elements in a manner readily understood. Alternatively, the screw member 15 may be constructed of insulating material and provided with a conducting head or contact element engaging the screw threads in the conducting washers, whereby the switch may serve to connect selectively the movable contact element to a plurality of external circuits connected to the leads 14a–14e, respectively. This type of switch is shown on Figure 3.

As is understood, the insulating washers 13a–13d are not threaded internally and have an internal diameter sufficient to allow unobstructed passage of the screw member 15 through the stack. Furthermore, the conducting and insulating washers may have a suitable shape, such as square, rectangular, circular, etc., and/or may be suitably mounted or retained, to prevent relative rotation, as the screw 15 is advanced through and withdrawn from the stack.

Although the pitch of the screw threads may have any desirable value in relation to the thickness of the metal washers 12a–12e, a one-to-one ratio is shown in the drawing which has been found to produce satisfactory results. Furthermore, the thread may be advantageously of the double or triple-thread type, to further improve the operation of the switch.

Let us now consider a contact or conducting washer within the interior of the stack, that is, a conducting washer having an insulating washer on both sides thereof, such as, for instance, the conducting washer 12b in Fig. 1. In this case, the insulating washer 13a on one side of the conducting washer 12b and the insulating washer 13b on the other side of the conducting washer 12b exert substantially equal and opposite forces or pressures upon the conducting washer 12b. As a result, the conducting washer 12b, so to speak, is freely suspended or "floats" between the threads of the screw member 15 since the elastic pressure by the insulating washer 13a is substantially counterbalanced by the pressure of the insulating washer 13b. This may result in a less effective and intimate contact between the threads of the screw member and the conducting washers, compared with the contact connection between an end washer and the screw member.

In my U. S. Patent #2,755,364 it was assumed that there is sufficient variation in the stiffness and size of resilient washers to make perfectly balanced pressures on the two sides of the conducting washers practically impossible. In practice, a completely balanced condition never exists due to unavoidable differences or tolerance range as to the size or dimensions of the members, whereby there is always a certain pressure differential between the forces in such manner as to result in a unilateral pressure and, in turn, a satisfactory contact connection between the screw member and stationary contacts of the switch. However, if the play between the threads is substantial or if the switch has been used over a longer period and the threads have become worn, the natural discrepancy in the characteristics and dimensions of the insulating washers may no longer be sufficient to insure a reliable and effective switch operation.

By the present invention the foregoing and related shortcomings and difficulties of a switch of this type are substantially overcome by the provision of relatively simple and efficient means to create an unequal or unilateral compressive force by the insulating members upon all of the conducting members of the switch, in such a manner as to insure a uniform effective contact connection between all of the stationary contacts and the rotatable screw contact of the switch.

This object may be achieved according to one embodiment of the invention shown in Fig. 1 by a progressive variation of the resiliency of the successive insulating washers, such as by progressively reducing the resiliency or increasing the hardness of the materials from one end to the opposite end of the stack. Thus, in Fig. 1, the washer 13a may have a greater resiliency than the washer 13b whose resiliency is, in turn, greater than that of the washer 13c and so on or, in other words, the hardness of the materials of the washers 13a–13d increases progressively, as indicated by the increasing closeness of the cross-hatching lines in the drawing. As a result, adequate unequal pressures will be applied under all circumstances upon the opposite faces of all the conducting washers or contacts of the stack. An effective and intimate contact connection is thus insured for all of the contact members resulting in increased life and other advantages readily understood from the foregoing.

If rubber is used as insulating material, the hardness may be staggered in practical "durometer" units, 30 durometer representing a soft rubber, such as foam rubber, and 60 durometer representing a harder type of rubber available on the market. In this instance, by proper staggering of the hardness values of successive insulating members, equally effective electric contact may be achieved between any of the stationary washers or contacts of the switch and the rotatable screw contact.

The variation in resiliency, especially in the case of a stack containing a large number of conducting and insulating members and utilizing the prnciple of a uniform thread on screw member 15 in conjunction with a smaller distance between conductive washers when non-engaged than when engaged, such as described hereinbefore and shown in Fig. 4, may result in a substantial variation in the displacement of the members in the initial or non-engaged condition of the stack. This displacement, if excessive, may cause the screw member 15 to improperly engage the threads of the conducting washers, such as by entering the wrong thread, which, in turn, may result in jamming and other defects. In order to pervent this difficulty, an auxiliary non-compressible or rigid insulating washer or spacing element may be interposed between the conducting washers or in parallel to the compressible insulating washers, to limit the compression or displacement of the latter.

In Fig. 2, this additional auxiliary washer placed between the conducting washers 12a and 12b and shown at 20 is arranged outside the insulating washer 13a and has a width or thickness W such as to limit the compression of the insulating washer 13a.

The non-compressible auxiliary washer 20, which may consist of a suitable insulating plastic, either separate or molded as a unit with the washer 13a, should have a thickness somewhat less than the spacing between the conducting washers 12a and 12b in their engaged position with screw member 15, so as to limit the initial or non-engaged compression of the insulating members. This affords ready engagement of the threads of the conducting washers by the screw member, on the one hand, and enables adequate compression of the washer 13a and, in turn, effective contact connection in the engaged position of the conducting washers and screw member 15, on the other hand.

Another method and arrangement for achieving the results and novel effects of the invention, that is, a unilateral pressure upon all of the conducting members of the stack by the screw member 15, consists in using one type of resilient material for all the spacing insulating washers and varying the dimensions or effective pressure areas of the washers, in the manner shown by Fig. 3 of the drawing. In the latter, the inner diameter of the insulating washers 13a, 13b and 13c is increased progressively from values $d_1$ to $d_2$ to $d_3$, respectively. In other words, washer 13b will resist compression more than washer 13a and, similarly, washer 13c will resist compression more than washer 13b, whereby to provide the equivalent of washers of equal size and increasing degrees of hardness as in Fig. 1, to again result in unilateral pressures upon the conducting washers and, in turn, a uniform contact pressure between the screw member 15 and all of the conducting washers of the stack, in a manner readily understood from the foregoing.

In Fig. 3, the screw member 15 is furthermore shown to consist of an insulating portion 15a provided with a conducting head 15b which has a central extension 15c, passing through the part 15a and being connected to a lead 18 through a suitable slidable contact or the like (not shown). This construction enables a selective coupling or connection of a plurality of external circuits by the switch, in the manner pointed out hereinabove. The conducting portion 15b need not be positioned only at the leading end of the screw member but may be located anywhere along its length.

Another method of creating unequal or unilateral pressures upon the opposite sides of the conducting washers 12a-12d, Fig. 4, consists in alternating compressible washers 13a, 13b . . . with non-compressible washers 21a, 21b . . . In this case, the non-compressible washers advantageously have a thickness which is slightly less than the dimension between the conducting washers 12a-12d when in engagement with the screw member 15. As a result, when the conducting washer 12b immediately following the non-compressible washer 21a is engaged by the screw 15, the non-compressible washer 21a, being thinner than the spacing distance between the conducting washers 12a and 12b in the engaged position with the screw 15 will be loose and play no further part in the pressure upon the conducting washers. In other words, this again provides a unilateral pressure upon all of the conducting washers 12a-12d by the insulating washers 13a, 13b . . . in substantially the same manner as in the case of the conducting washers at the ends of the stack. By this construction of the switch, a substantially uniform electric contact between all the conducting washers or contacts 12a, 12b . . . of the switch and the cooperating movable contact or screw member 15 is insured in a most simple and reliable manner substantially independently of any play or variation thereof within wide limits between the cooperating threads of the members.

The afore-described assembly using alternate compressible and non-compressible insulating washers will operate satisfactorily only when used with the method of screw engagement, referred to hereinabove, where the screw member is provided with uniform threads up to its leading edge and the spacing distances between the conducting washers are less with the screw being disengaged compared with the spacing distances with the screw in engaged position. In order to utilize the expanded screw method of operation, that is, where the pitch of the leading thread or a fraction thereof of the screw member 15 is greater than the pitch of the remaining threads in order to facilitate the screw engagements with the conducting washers, as described and shown by Fig. 2 of the abovementioned U. S. patent, the rigid or non-compressible washers in the case of Fig. 4 should be replaced by the compressible washers which are harder or less resilient than the remaining compressible washers of the stack. In other words, in Fig. 4, the non-compressible washers 21a, 21b may also be of compressible material, but of greater hardness than the insulating washers 13a, 13b. This system of alternate hard and soft insulating washers will also operate with the uniform thread screw member.

Item 16 in Figs. 1 and 4 represents a relatively large washer or spacing member of compressible material being interposed between the end of the stack and the mounting plate 11, to take up the difference in length of the stack during the operation of the switch. Item 17 is a retaining member or housing surrounding the stack, to maintain the washers in place and to prevent relative rotation thereof when the screw 15 is advanced within or withdrawn from the stack. In Fig. 4, the compressible insulating washers 13a and 13b are shown combined with rigid insulating washers or spacers 20a and 20b, respectively, to limit the compression of the washers in the same manner as described in connection with Fig. 2.

In the foregoing description, it has been assumed that the assembly and manufacture of the switch is carried out according to the method described in the referenced Patent No. 2,755,364, that is, by first stacking and internally threading a plurality of metal washers and replacing every second metal washer by a compressible insulating washer of a thickness differing from the thickness of the metal washers, such as, for example, a thickness about 10% greater than the thickness of the metal washers. In other words, the total tapped metal washers are divided into two halves with each half serving to make a single switch. With such a method, the pitch of the screw thread may have any desirable value and is independent of the thickness of the metal washers. In the example according to the drawing, the metal washers and the insulating washers in their compressed condition are shown with a thickness equal to the pitch of the threads of the metal washers and screw member, respectively, to reduce the number of revolutions of the screw member in advancing it through the total stack or operating range of the switch. It will be evident, however, that any other relation between the pitch and the thickness of the washers may be employed, to suit existing conditions and requirements.

According to an alternative method of making a switch according to the invention, all the metal washers of a tapped stack are utilized for the assembly of a single switch by interposing compressible insulating washers between adjacent metal washers. In this case, the thickness of the insulating washers must be related to the pitch of the threads, to secure a compression or expansion in the engaged position of the adjacent metal washers by the screw member. As an example, the normal or non-compressed thickness of the insulating washers may be about 10% greater than the pitch or a whole number multiple thereof, whereby to result in a compression of the insulating washers in the engaged position of the adjacent metal washers by the screw member. More specifically, if the thickness of the metal washers equals the screw pitch, the insulating washers in the normal or non-compressed position should be about 10% thicker than the metal washers, to insure adequate contact pressure between the metal washers and the screw member. Again, in this case, the effectiveness and reliability of the contact connections may be increased by the utilization of the improved means according to the invention, such as by staggering the hardness or effective pressure areas, or by the use of alternate rigid and compressible insulating washers, in substantially the manner as described and understood from the foregoing.

In the foregoing the invention has been described with reference to a specific illustrative device. It will be evident, however, that variations and modifications, as well as the substitution of equivalent elements for those shown and disclosed herein for illustration, may be made without departing from the broader spirit and scope of the invention as set forth in the appended claims. The specification and drawing are accordingly to be regarded in an illustrative rather than in a restrictive sense.

We claim:

1. A multiple contact electric switch comprising a stack of one common and at least two insulated threaded conducting contact members alternating with insulating spacing members, means including end pressure members, to normally compress said stack, a rotatable screw member forming a cooperating contact and arranged for progressive engagement with an disengagement from said insulated contact members, to effect selective electric insulated contact connections with said contact members, and means to create unilateral resilient contact pressures between said screw member and the contact members intermediate the end contact members of the stack adjacent to said pressure members.

2. A switch as claimed in claim 1, wherein said last means consists in the provision of compressible insulating spacing members separating said contact members, said spacing members having a resiliency progressively varying from one to the opposite end of said stack and having a normal assembled thickness greater than the spacing distance between the adjacent contact members in the engaged position with said screw member.

3. A switch as claimed in claim 1, wherein said last means consists in the provision of compressible insulating spacing members separating said contact members, said spacing members having a resiliency progressively varying from one to the opposite end of said stack and having a normal assembled thickness greater than the spacing distance between the adjacent contact members in the engaged position with said screw member, and further rigid insulating spacing members between said contact members, to limit the compression of at least part of said compressible spacing members, said rigid spacing members having a thickness less than the spacing distance between the adjacent contact members in their engaged position with said screw member.

4. A switch as claimed in claim 1, wherein said last means consists in the provision of compressible insulating members being of like material and having progressively varying effective pressure areas from one end to the opposite end of the stack, said spacing members having a normal assembled thickness greater than the spacing distance between the adjacent contact members in their engaged position with said screw member.

5. A switch as claimed in claim 1, wherein said last means consists in the provision of alternate compressible and non-compressible insulating spacing members of said stack, said compressible spacing members having a normal assembled thickness greater than and said non-compressible spacing members having a thickness smaller than the spacing distance between adjacent contact members in their engaged position with said screw member.

6. A switch as claimed in claim 1, wherein said last means consists in the provision between successive contact members of said stack of alternate compressible insulating spacing members having, respectively, a first and second predetermined resiliency, said spacing members having a normal assembled thickness greater than the distance between adjacent contact members in their engaged position with said screw member.

7. A multiple contact electric switch comprising a stack of internally threaded conducting washers forming a plurality of relatively stationary switch contacts and alternating with insulating spacing washers, a rotatable screw member forming a cooperating contact arranged coaxial with said stack for progressive engagement with and disengagement from said conducting washers, to effect selective electric contact connection with the said conducting washers, said insulating spacing washers having a normal assembled thickness less than the spacing distance between adjacent conducting washers in their engaged position with said screw member, and means to create unilateral resilient contact pressures by said screw member upon said conducting washers.

8. A switch as claimed in claim 7, wherein said last named means consists in the provision of compressible insulating spacing members, separating said conducting washers, said spacing members having a resiliency progressively varying from one to the opposite end of said stack and having a normal assembled thickness less than the spacing distance between the adjacent conducting washers in the engaged position with said screw member.

9. A switch as claimed in claim 7, wherein said last means consists in the provision of compressible insulating spacing washers separating said conducting washers, said spacing washers having a resiliency progressively varying from one to the opposite end of said stack and a normal assembled thickness less than the spacing distance between the adjacent conducting washers in their engaged position with said screw member, and further rigid insulating spacing washers between said conducting washers, to limit the compression of at least part of said compressible spacing washers, said rigid spacing washers having a thickness less than the spacing distance between adjacent conducting washers in their engaged position with said screw member.

10. A switch as claimed in claim 7, wherein said last means consists in the provision of compressible insulating spacing washers between said conducting washers being of like material and having progressively varying effective pressure areas from one to the opposite end of the stack, said spacing washers having a normal assembled thickness less than the spacing distance between the adjacent conducting washers in their engaged position with said screw member.

11. A switch as claimed in claim 7, wherein said last means consists in the provision of alternate compressible and non-compressible insulating spacing washers of said stack, said compressible spacing washers having a normal assembled thickness less than and said non-compressible washers having a thickness smaller than the spacing distance between adjacent conducting washers in their engaged position with said screw member.

12. A switch as claimed in claim 7, wherein said last means consists in the provision between successive conducting washers of said stack of alternate compressible insulating spacing washers having respectively, a first and a second predetermined resiliency, said spacing washers having a normal assembled thickness less than the distance between adjacent conducting washers in their engaged position with said screw member.

13. A multiple electric switch comprising a stack of internally threaded conducting washers forming a plurality of relatively stationary switch contacts, alternate compressible and non-compressible insulating spacing washers interposed between successive conducting washers of said stack, means to apply a preliminary pressure upon stack, a rotatable screw member forming a cooperating contact coaxial with said stack and arranged for progressive threaded engagement with and disengagement from said conducting washers, to effect selective electric contact connection with said conducting washers therewith, said compressible washers having a thickness under said preliminary pressure less than when said conducting washers are engaged with said screw member.

14. A switch as claimed in claim 13, wherein said non-compressible washers have a thickness slightly smaller than the spacing distance between adjacent conducting washers in their engaged position with said screw member.

15. A switch as claimed in claim 1, said rotatable screw member having an insulating and a conductive portion, said conducting portion arranged to effect selective individual electric contact connection with said stationary contact members, and means to provide electrical contact to said conductive portion.

16. A method of making a switch of the type described which comprises assembling a stack of rigid contact washers, threading said washers internally at a predetermined pitch, interposing non-threaded compressible insulating washers between adjacent contact washers of said stack, said insulating washers having a thickness differing from said pitch, and threading a cooperating screw contact member having said predetermined pitch into said contact washers.

17. A method of making a switch of the type described which comprises assembling a stack of rigid contact washers, threading said washers internally at a predetermined pitch, interposing non-threaded compressible insulating washers between adjacent contact washers of said stack, said insulating washers having a thickness of the order of 10% greater than said pitch, and threading a cooperating screw member having said predetermined pitch into said contact washers.

18. A method of making a switch of the type described which comprises assembling a stack of rigid contact washers, internally threading said washers at a pitch equal to the thickness thereof, interposing non-threaded compressible insulating washers between adjacent contact washers of said stack, said insulating washers having a thickness of the order of about 10% greater than said pitch, and threading a screw contact member having said predetermined pitch into said contact washers.

References Cited in the file of this patent

UNITED STATES PATENTS

| | | |
|---|---|---|
| 722,453 | Murphy | Mar. 10, 1903 |
| 913,809 | Carr | Mar. 2, 1909 |
| 2,539,352 | Hewlett | Jan. 23, 1951 |
| 2,633,485 | Patnode | Mar. 31, 1953 |
| 2,735,917 | Davis | Feb. 21, 1956 |